United States Patent

[11] 3,533,483

| [72] | Inventor | Hugh Anthony Ballinger, Abingdon, England |
|---|---|---|
| [21] | Appl. No. | 703,962 |
| [22] | Filed | Feb. 8, 1968 |
| [45] | Patented | Oct. 13, 1970 |
| [73] | Assignee | United Kingdom Atomic Energy Authority, London, England |
| [32] | Priority | Feb. 10, 1967, |
| [33] | | Great Britain, |
| [31] | | 6,590/67 |

[54] VEHICLE WITH VERTICALLY ANGULARLY ADJUSTABLE ASYMMETRICAL WHEELED FRAMES
12 Claims, 4 Drawing Figs.

[52] U.S. Cl............................................. 180/9.38, 180/2, 180/9.52
[51] Int. Cl...................................................... B62d 55/02
[50] Field of Search........................................... 280/5.22, 47.11; 180/9.24, 9.38, 9.52, 22(D), 7, 9.2, 21, 22, 41, 8

[56] References Cited
UNITED STATES PATENTS

| 1,107,791 | 8/1914 | Houghton...................... | 180/9.52X |
| 2,224,901 | 12/1940 | Cunningham................. | 280/47.11X |
| 2,393,324 | 1/1946 | Joy............................... | 180/22X |
| 2,426,342 | 8/1947 | Couse........................... | 180/9.52 |
| 3,231,290 | 1/1966 | Weyer........................... | 280/5.22 |
| 3,057,319 | 10/1962 | Wagner......................... | 180/7UX |
| 3,288,234 | 11/1966 | Fetiz............................. | 180/9.24X |
| 3,348,518 | 10/1967 | Forsyth........................ | 180/8X |
| 3,417,832 | 12/1968 | Ziccardi....................... | 180/9.52X |

*Primary Examiner*—Richard J. Johnson
*Attorney*—Larson, Taylor and Hinds

ABSTRACT: In a vehicle provided with endless tracks the track frames are connected by a single transverse shaft and the body is mounted on said shaft so that the track frames can be angularly orientated about the shaft in any position relatively to the body. In elevation the tracks are asymmetrical about the shaft and have several straight sections capable of contacting the ground.

By providing the body with a ground engaging member the track frames can be completely rotated to bring any one of the straight sections in contact with the ground.

Patented Oct. 13, 1970

VEHICLE WITH VERTICALLY ANGULARLY ADJUSTABLE ASSYMETRICAL WHEELED FRAMES

This invention relates to vehicles and in particular to vehicles adapted to traverse varying terrain, for example over broken or rough surfaces and up and down steps or stairways.

Such vehicles are often used as transport platforms for mobile manipulator systems, i.e. devices permitting remotely controlled operations such as adjustment maintenance or accident recovery of equipments under hazardous conditions. In the past difficulty has been experienced in providing a vehicle having a wheel or track system equally suitable for the various types of surface encountered in such operations and it is an object of the present invention to provide a new and improved form of vehicle whereby the said difficulties are minimised.

According to the invention a vehicle comprises a body, port and starboard wheeled assemblies pivotted about a common transverse axis on the body, a ground engaging member on the body and means to rotate the wheeled assemblies in angular unison relative to the body, the said assemblies assymetrical in relation to said axis. The ground engaging member preferably comprises a steerable wheel.

In a preferred embodiment each assembly has two arms of unequal length extending in opposite directions from the pivotal axis of the assembly, a wheel at the extremity of each arm, and a wheel on said axis.

The wheel on the pivotal axis may be larger than the wheels at each extremity and the three wheels preferably have a common tangent.

To enable the nature of the invention to be more readily understood one embodiment of the invention will now be described, solely by way of example, with reference to the accompanying drawings. In the drawings.

Figure 1:
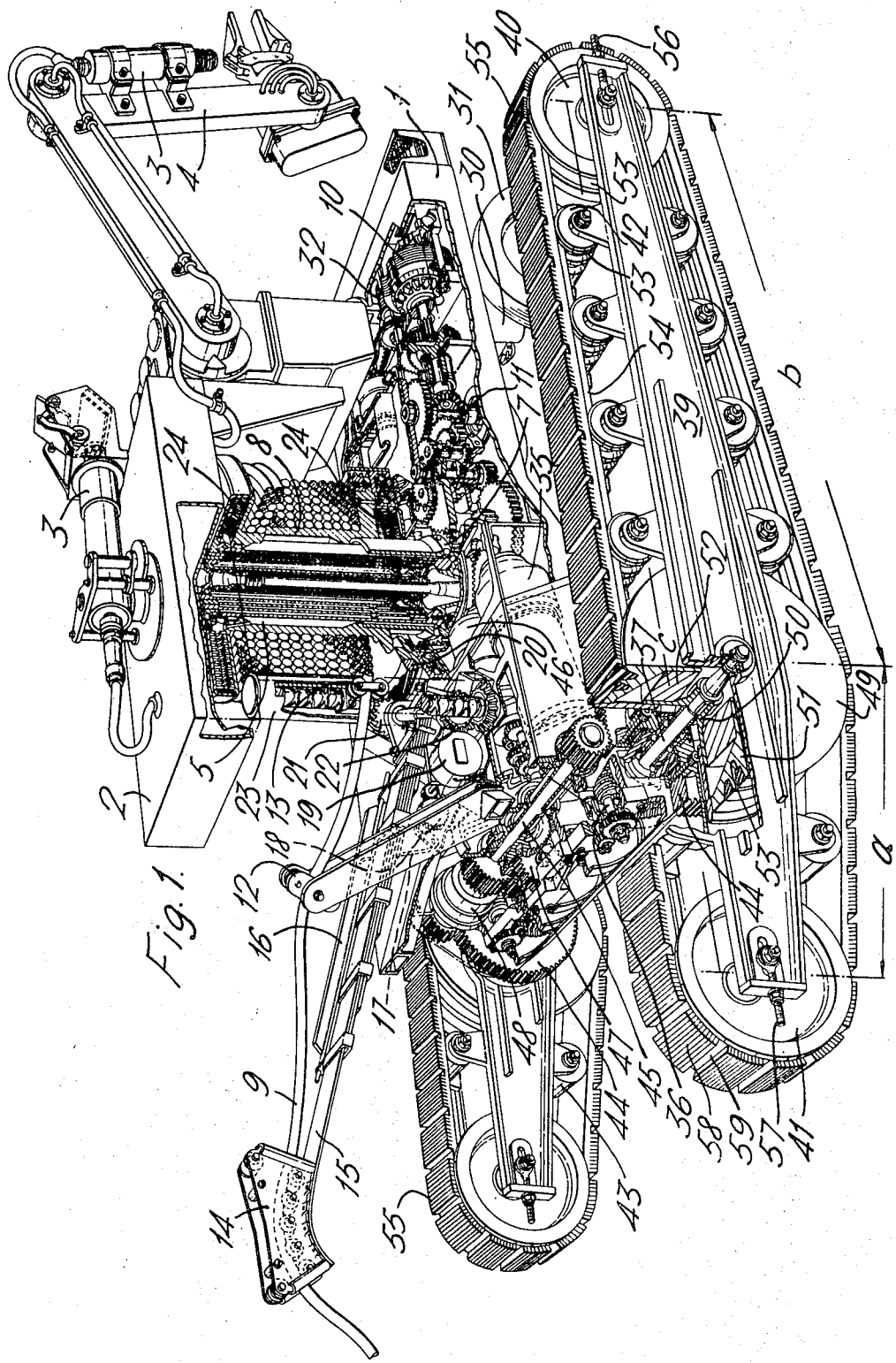
FIG. 1 is a cut-away perspective view of a tracked manipulator vehicle.

Referring specifically to FIG. 1 the manipulator vehicle comprises an electrically powered tracked vehicle operated via a trailing cable. The vehicle is provided with a platform body 1 which carries a rotatable and vertically moveable turret head 2 arranged to support television cameras 3 and a power manipulator arm 4. The turret head 2 houses the preamplifiers and control gear for the television cameras and is raised or lowered hydraulically on a manipulator post formed by a plurality of telescopic hydraulic rams 5. The manipulator post is located on a turntable gear wheel 6. An annular drive gear 7 is rotatably supported on the turntable gear 6 and drives a spoollike cable drum 8.

Drum 8 carries an operating length of a multicored control and power cable 9. The drum surrounds the manipulator post and an electric motor 10 provides an alternate drive to rotate the manipulator post and turret head or the cable drum through an epicyclic gear train 11. The cable is fed on or off the drum via a pair of fair leads 12 and 13 and carried clear of the vehicle by a cable guide 14 mounted at the end of a constant stress cantilever spring 15. A sense-rod 16 located on the spring interconnects, through a linkage 17 and a gear-train 18, with a variable resistor 19 to control the speed and sense of rotation of drive motor 10 and hence the movement of the cable drum. The lower rim of the cable drum is provided with a skew gear 20 which drives, through gears 21 and 22, a cable self-layering device 23. Upper and lower rims of the cable drum are provided with a multiplicity of slip rings 24 whereby connection may be made between the cable drum and the various equipments on the vehicle.

One end of the body is provided with a twin-wheel steering bogey 30. The wheels 31 are rubber tired and the wheel mountings include a high energy absorption system (to be described more fully in relation to the main drive wheels). The steering bogey turns about a vertical axis slightly offset from the axis of the wheels and the steering arrangements include an electric steering motor connected to the bogey through a worm and worm wheel steering gear 32.

The vehicle propelling system comprises port and starboard electric drive motors 35 each connected through a worm and worm wheel gear assembly 36 to its respective axle drive shaft 37. The outer end of each axle shaft is journaled in the outer frame member of a wheeled assembly. Each assembly comprises a pair of spaced girderlike frames 39 arranged to support track wheels 40, 41 and a plurality of track idler pulleys 42 and 43. The inboard frame of each assembly is provided with a fixed annular gear wheel 44 concentrically located in relation to its respective axle shaft and a transverse lay-shaft 45 extends across the vehicle and interconnects both gears. The assemblies are driven in unison by a track arm rotation motor 46 which operates on the lay-shaft through a gear train 47 and a stress limiting clutch 48. The lay-shaft drive is provided with a brake (not shown) such that the assemblies can be locked in any angular position in relation to the vehicle body.

A main drive wheel 49 is secured to each axle shaft and located between the inner and outer frames of each assembly. Each drive wheel comprises a drive plate 50 splined to the axle shaft and an outer wheel casing 51, an annular high energy absorption member 52 being sandwiched between the drive plate and the wheel casing. Member 52 is bonded to both wheel components to provide an impact resistant wheel suspension system.

The outer rims of wheel casing 51, wheel 40 and idler pulleys 42 are provided with two vee-belt grooves 53 and power is transmitted to wheel 40 through two vee-belts 54. An endless rubber track 55 extends around the wheels and idler pulleys. Each assembly includes tensioning devices 56 and 57 permitting adjustment of the vee-belts and the rubber track respectively.

The rubber track is formed with raised treads 58 and dipped grousers 59 each tread comprising a multiplicity of snipes formed by a series of closely spaced transverse slits. This form of track is particularly advantageous in absorbing inertia energy should the vehicle slip on stairs or steps.

Each drive wheel is located in relation to its assembly such that the track 55 defines three distinct track sections a, b and c, i.e. a short inclined section a extending from track wheel 41 to the drive wheel, an intermediate section b extending from the drive wheel to the track wheel 40 and a main section c extending between the track wheels 40 and 41. The distances between wheel 40 and the drive axle and between wheel 41 and the drive axle are approximately in the ratio 2:1 and track wheel 41 is located slightly forward of the bogey wheels 31.

In operation, the assemblies may be rotated around the axle shaft to take up any desired angular position relative to the body thereby allowing the track section most suitable for the operation in hand to engage the ground surface.

Figure 2:
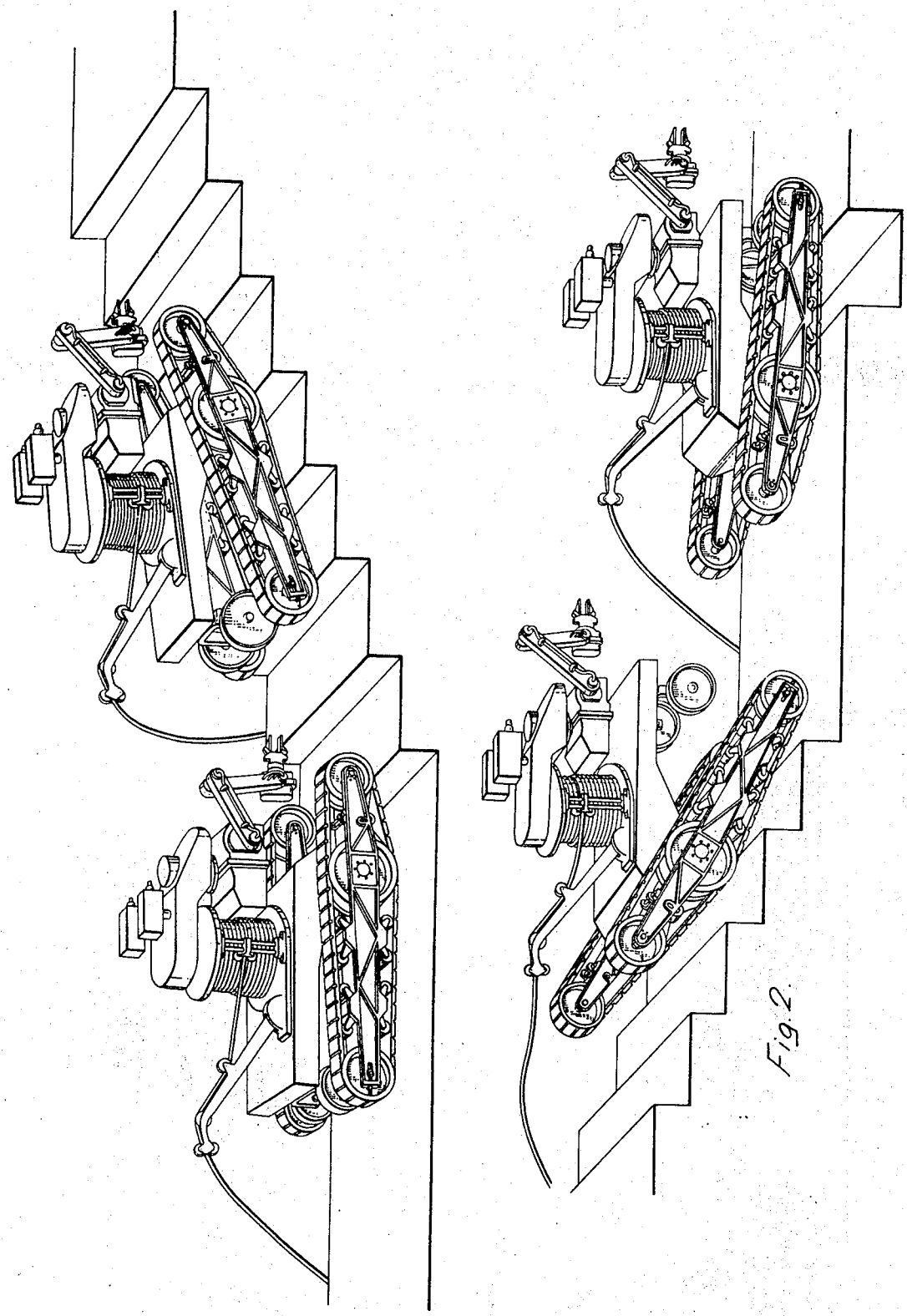
FIGS. 2, 3 and 4 show the vehicle in various operational modes.
Figure 3:
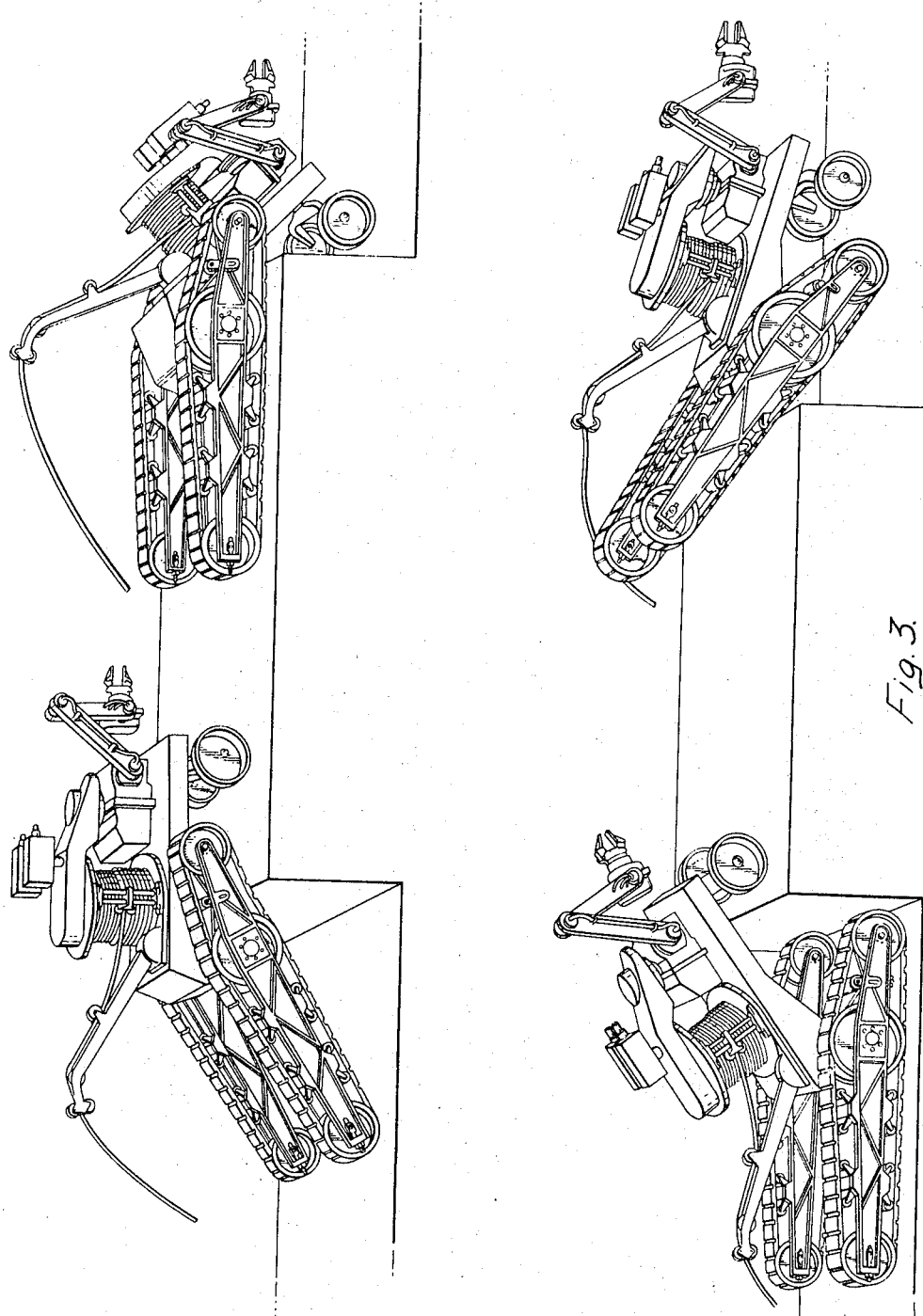
Figure 4:
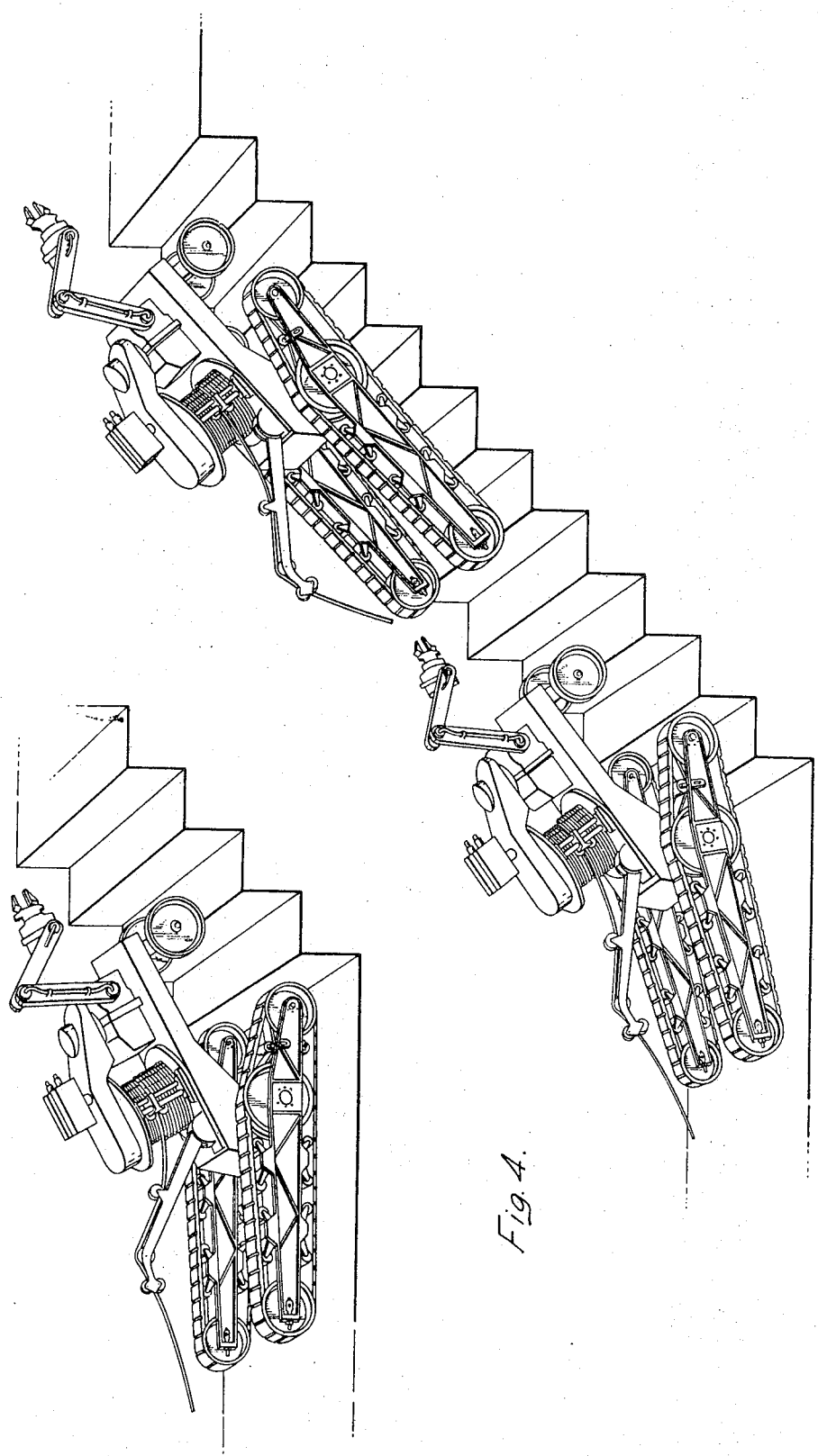

Referring now to FIGS. 2, 3 and 4 of the drawings, FIG. 2 shows the vehicle approaching, climbing and descending a shallow and gradual stairway. For ascent the vehicle is orientated such that the short inclined track section a engages the first step, the bogey wheels being positioned at the rear of the vehicle and the angle of inclination of the assemblies adjusted, relative to the body, to raise the bogey wheels clear of the ground surface and steps. For a descent, the turret of the vehicle is turned through 180°, the bogey wheels are positioned at the forward end of the vehicle by rotating the assemblies and the wheels raised clear of the steps. Further relative angular movement between the wheeled assemblies and the body may be used to control the position of the centre of gravity and thus the stability of the vehicle as required.

FIG. 3 illustrates the vehicles traversing a steep step, in this mode the vehicle approaches the step on its main track section c with the bogey wheels located at the forward end of the vehicle and projecting in front of the forward track wheel. The body is raised until the bogey wheels are above the step height, the vehicle is moved forward until the end of the tracks abut the step face and the bogey wheel is then lowered on to the step. The wheeled assemblies are rotated relative to the body thus raising the rear of the body to the level of the step. At the same time power is supplied to the track drive such that the rear end of the track engages the ground surface and pushes the vehicle forward and as soon as the third of the track reaches the edge of the step continued forward motion and counter rotation of the assemblies lifts the vehicle on to the step.

When descending a step the vehicle moves to the edge, relative angular movement between the body and the wheeled assemblies lowers the bogey wheels over the edge to ground level where upon forward drive on the tracks and counter rotation of the wheeled assemblies allows the vehicle to lower itself gently over the step.

FIG. 4 shows the vehicle climbing a steep stairway, i.e. up to 45° maximum slope.

In this instance, the vehicle operating on its main track c and having the bogey wheels positioned at the forward end of the vehicle, approaches the stairway in a manner similar to that used for traversing a large step, i.e. with the bogey wheels and body raised. The vehicle moves forward until the front end of the tracks are abutting the lower step, the bogey wheels are placed on the second step, the body is raised by relative angular movement between the wheeled assembly and the body, whereupon the vehicle is driven forward by the tracks on to the first step. The sequence of movements is repeated lifting the vehicle up step by step until a sufficient length of track section c is on the stairway to lift the vehicle up the stairway using the tracks alone.

If the pitch of the steps is such that when the track abuts the bottom step the bogey wheels precisely abut the front of a step, the body may not be able to lift the wheeled assemblies since a small forward movement of the vehicle is required during each lift. Under these conditions the bogey wheels are raised and the bogey rotated through 180° about its offset vertical axis thus altering the distance between the front of the tracks and the bogey wheels and curing the condition.

In an additional mode of operation (not illustrated) the wheeled assemblies may be positioned such that track sections a and b are both inclined to the ground surface and the track makes substantially line contact with the ground below the drive wheels. The vehicle is then in a condition equivalent to a four wheel vehicle and may be operated and steered in the conventional manner for such vehicles.

A vehicle constructed as described may have the overall dimensions of a man positioned on his hands and knees i.e. approximately 28 inches wide, 54 inches long and 24 inches high. Such a vehicle could easily pass into buildings through a conventional doorway, climb obstacles of up to 50 percent of its own track length i.e. 26 inches and stairways of up to 45 percent maximum slope. The cable drum stores 200 feet of control and power cable. The turret, carrying television cameras and the manipulator, can be raised to 5.5 feet above floor level and the manipulator arm can handle weights of 80 lb. within a radius of 4.5 feet. The high energy absorption wheel suspension system allows the vehicle to survive a two foot drop or a head-on collision at maximum speed (6 ft./sec.). The forward end of the body is provided with an aluminium honeycomb shock absorbing member as an additional safeguard in case of collision.

It will be appreciated that vehicle performance and capability in climbing obstacles and steep stairways is determined by the dimensions, i.e. the "reach", of the vehicle. In the vehicle described the "reach" depends upon the distance the bogey wheels project forward beyond the tracks.

It will also be apparent that while the invention has been described in relation to a tracked vehicle the invention is in no way limited to tracked vehicles, for example, with the vehicle described, the rubber driving tracks can be removed and tired wheels substituted for the drive and track wheels. The operating principles remain in that the wheeled assemblies may be moved relative to the vehicle body to provide variable vehicle track length between the steering bogey wheels and the driving wheels to suit the terrain.

I claim:
1. A vehicle comprising a body, a pair of wheeled assemblies mounted on said body, each of said wheeled assemblies being rotatable through a full circle, relative to the body, about a common transverse axis, and each of said wheeled assemblies comprising two arms of unequal length extending in opposite directions from the pivotal axis of the assembly, a wheel at the extremity of each arm and a wheel on said axis, a ground engaging member on the body and means to rotate the wheeled assemblies in angular unison relative to the body, about said axis.

2. A vehicle as claimed in claim 1 wherein the ground engaging member comprises a steerable wheel.

3. A vehicle as claimed in claim 1 wherein an endless track is provided for said wheels of each assembly.

4. A vehicle as claimed in claim 1 wherein the body carries a turret adapted to be rotated and elevated.

5. A vehicle as claimed in claim 1 wherein the wheel of each assembly on said axis is larger than the wheels at each extremity.

6. A vehicle as claimed in claim 5 wherein the three wheels of each assembly have a common tangent.

7. A vehicle as claimed in claim 1 wherein the wheel of each assembly on said axis is driven by power means.

8. A vehicle as claimed in claim 7 wherein power transmission means interconnect the wheel on the axis of rotation of the assemblies and a wheel on the extremity of one arm.

9. A vehicle comprising a body, a pair of wheeled assemblies rotatable through a full circle about a common transverse axis on the body, a ground engaging member on the body, means to drive a wheel of each of said assemblies, and means to rotate the wheeled assemblies in angular unison relative to the body, each of the assemblies being asymmetrical in relation to the said axis and comprising a first wheel mounted for rotation about the axis of rotation of each assembly and second and third wheels spaced from said first wheel, said first, second and third wheels being aligned with respect to one another such that they share a first common tangent, said first and second wheels share a second common tangent, and said first and third wheels share a third common tangent which is angularly disposed with respect to the first and second tangents.

10. A vehicle according to claim 9 wherein said second and third wheels are substantially the same diameter and are smaller than said first wheel.

11. A vehicle according to claim 9 wherein power transmission means drivably connect one of said second or third wheels to said first wheel.

12. A vehicle according to claim 9 wherein an endless track is provided for said first second and third wheels.